United States Patent [19]

Engel et al.

[11] Patent Number: 5,197,125
[45] Date of Patent: Mar. 23, 1993

[54] ACCESS ASSIGNMENT IN A DAMA COMMUNICATION SYSTEM

[75] Inventors: Gernot M. Engel, Del Mar; Dwight R. Bean, San Diego; Edward F. Smith, Escondido, all of Calif.

[73] Assignee: The Titan Corporation, San Diego, Calif.

[21] Appl. No.: 629,668

[22] Filed: Dec. 18, 1990
(Under 37 CFR 1.47)

[51] Int. Cl.$^5$ ............................................. G06F 13/14
[52] U.S. Cl. ................................. 395/200; 395/325; 370/95.3; 370/58.2; 364/238.3; 364/241.2; 364/DIG. 1
[58] Field of Search .................. 364/DIG. 1, DIG. 2; 370/60, 94.1, 95.1, 95.3, 58.1, 58.2; 395/200, 325

[56] References Cited

U.S. PATENT DOCUMENTS 4,792,948 12/1988 Hangen et al. ...................... 370/58.3

OTHER PUBLICATIONS

Tham, "A Burst Assignment Algorithm for Satellite-Switched/Frequency-Hopping TDMA System With Uplink/Downlink Capability Constraints", Proceedings of the 9th AIAA Communication Satellite Systems Conference, 1986, pp. 168-171.
JTC3A Report 8201, Nov. 1985.
Taylor and Bernstein, "TACS-A Demand Assignment System for FLEETSAT", IEEE Trans. on Communications, vol. Com-27, No. 10, Oct. 1979, pp. 1484-1495.
Taylor, "Terminal Access Control System (TACS) Circuit Allocation", MIT Lincoln Laboratories, 1978.
Goldberg. "Edge-Coloring of Multigraphs: Recoloring Technique", Journal of Graph Theory, vol. 8 (1984) 123-137.
Hopcroft and Karp, "An $n^{5/2}$ Algorithm for Maximum Matchings in Bipartite Graphs", SIAM J. Comput. 2:225-231, 1973.
Inukai, "An Efficient SS/TDMA Time Slot Assignment Algorithm", IEEE Transactions on Communications, vol. COM-27, No. 10, Oct. 1979, 1449-1455.
Bongiovanni, Coppersmith and Wong, "An Optimum Time Slot Assignment Algorithm for an SS/TDMA system with Variable Number of Transponders", IEEE Transactions on Communications, vol. COM-29, No. 5, May 1981, 721-726.
Abramson, "The Aloha System-Another Alternative for Computer Communication", Proceedings of the AFIPS Fall Joint Computer Conference, vol. 37, 1970, 281-285.
Engel and Smith, "Multiple Channel Demand Assignment Multiple Access (DAMA) System Design for UHF MILSATCOM", AIAA-90-0863-CP, pp. 712-719.

Primary Examiner—Robert L. Richardson
Attorney, Agent, or Firm—Edward W. Callan

[57] ABSTRACT

In a system for assigning to given user terminals in a multiple-user DAMA communication system access to time slots of a time frame within which to transmit messages identified in message-access requests from different given user terminals, a plurality of message-access requests from different given user terminals are stored in a memory and then processed to schedule the identified messages for transmission. First the stored requests are processed in accordance with predetermined priority constraints, in accordance with information contained in the message-access requests identifying transmission parameters of the respective identified messages and in accordance with the number of available time slots to thereby select a set of the respective messages for access-assignment to the available time slots; and then the message-access requests for the selected set of messages are processed to assign access to different combinations of the time slots for respectively transmitting the different messages of the selected set of messages. Access-assignment information identifying the time slots for which access has been assigned for the respective given user terminals is transmitted to a predetermined group of given user terminals during a common block of time slots, and the access-assignment information for different predetermined groups of user terminals is transmitted non-simultaneously to the different predetermined groups of user terminals.

10 Claims, 3 Drawing Sheets

ACCESS ASSIGNMENT IN A DAMA COMMUNICATION SYSTEM

BACKGROUND OF THE INVENTION

The present invention is generally directed to electronic data communications and is particularly directed to an improvement in a system for assigning access to time slots in a multiple-channel demand-assignment-multiple-access (DAMA) communication system.

DAMA communication systems are particularly useful in a network of user terminals that communicate with each other via a common communication link, such as a transponder in a communication satellite in Earth orbit. When a large number of user terminals share such a common communication link, it is necessary to assign different portions of the time and frequency spectrums for messages transmitted by the different user terminals to prevent interference between different messages that are transmitted simultaneously throughout the network. In a DAMA communication system, access to a plurality of different given user terminals is assigned in such a manner as to quickly and efficiently establish the communications linke for a large number of user terminals.

A prior art system for assigning to given user terminals in a multiple-user DAMA communication system access to time slots of time frames of a plurality of frequency channels within which to transmit messages identified in message-access requests from different given user terminals includes: means for storing a plurality of message-access requests from different given user terminals; means for processing the stored message-access requests to schedule the identified messages for transmission in accordance with information contained in the message-access requests identifying transmission parameters of the respective identified messages and in accordance with the number of available time slots by assigning access to different combinations of the time slots for respectively transmitting different messages identified by the processed message-access requests; and means for transmitting assignment information to the given user terminals identifying the time slots for which access has been assigned for the respective given user terminals, with the assignment information for different predetermined groups of user terminals being transmitted simultaneously to all of the different user terminals. The stored message-access requests may be reprocessed from time to time, such as every given number of time frames, in order to reassign access to different combinations of the time slots for respectively transmitting different messages. This allows frequent preemption of prior access assignments in favor of new messages of higher priority.

Only a segment of a typical message is transmitted during each time frame. Each segment of the message is compressed into a message burst which is transmitted during only a portion of the time slots of the time frame. The procedure for assigning the time slots has been to pack the message bursts of the different messages from the different user terminals into the time frame in such a manner as to minimize unassigned time slots, while adhering to equipment, protocol, connectivity, and priority constraints. To achieve this objective, a weight function is computed for each unscheduled burst. This weight function reflects the relative difficulty expected in finding time slots assignable to the unscheduled burst. The unscheduled bursts are then sorted by weight; and the processing means proceeds through the stored message-access requests. If no conflicts exist the processing means assigns time slots in the earliest available portion of the time frame to highest weighted burst. The user terminals are associated with different organizations, with some organizations being associated with more than one of the user terminals; and the message-access requests identify the organization associated with the user terminal and indicate a priority set by the organization for processing the message-access requests of the identified organization. To ensure that such priority is observed, the scheduling procedure includes a backtracking routine, which is performed whenever, after access to the time frame is assigned, a high priority message has not been scheduled and the aggregate duration of scheduled lower priority messages exceeds the duration of the high priority message. In the backtracking routine, the assignment of time slots for the lowest priority scheduled message is rescinded and the bursts are again weighted and sorted to effect the time slot assignments as described above. The backtracking routine is repeated whenever necessary to observe priority. The backtracking routine can on occasion delay the scheduling to such an extent that scheduling is not completed before it is time to transmit.

SUMMARY OF THE INVENTION

The present invention provides a system for efficiently assigning to given user terminals in a multiple-user communication system access to time slots of a time frame within which to transmit messages identified in message-access requests from different given user terminals. Such efficiency is accomplished by breaking up the processing of the message requests into separate stages. The system of the present invention includes means for storing a plurality of message-access requests from different given user terminals; means for processing the stored message-access requests to schedule the identified messages for transmission in accordance with predetermined priority constraints, in accordance with information contained in the message-access requests identifying transmission parameters of the respective identified messages and in accordance with the number of available time slots to thereby select a set of the respective messages for access-assignment to the available time slots; and means for processing the message-access requests for the selected set of messages to assign access to different combinations of the time slots for respectively transmitting the different messages of the selected set of messages. Since the set of message requests that are ultimately processed to assign access to the time slots are first selected in accordance with predetermined priority constraints, the final access-assignment processing usually can be accomplished without having to backtrack to satisfy priority constraints.

In a separate aspect, the present invention provides efficient transmission of the provided access assignments to the user terminals in a system for assigning to given user terminals in a multiple-user communication system access to time slots of a time frame within which to transmit messages identified in message-access requests from different given user terminals. Such system includes means for storing a plurality of message-access requests from different given user terminals; means for processing the stored message-access requests to schedule the identified messages for transmission in accordance with information contained in the message-access requests identifying transmission parameters of the respective identified messages and in accordance with the number of available time slots by assigning access to different combinations of the time slots for respectively transmitting different messages identified by the processed message-access requests; and means for transmitting assignment information to the given user terminals identifying the time slots for which access has been assigned for the respective given user terminals, with the assignment information for a predetermined group of given user terminals being transmitted during a common block of time slots, and with the assignment information for different predetermined groups of user terminals being transmitted non-simultaneously to the different predetermined groups of user terminals.

Advantages and additional features of the present invention are described in relation to the description of the preferred embodiment.

DESCRIPTION OF THE PREFERRED EMBODIMENT

Figure 1:
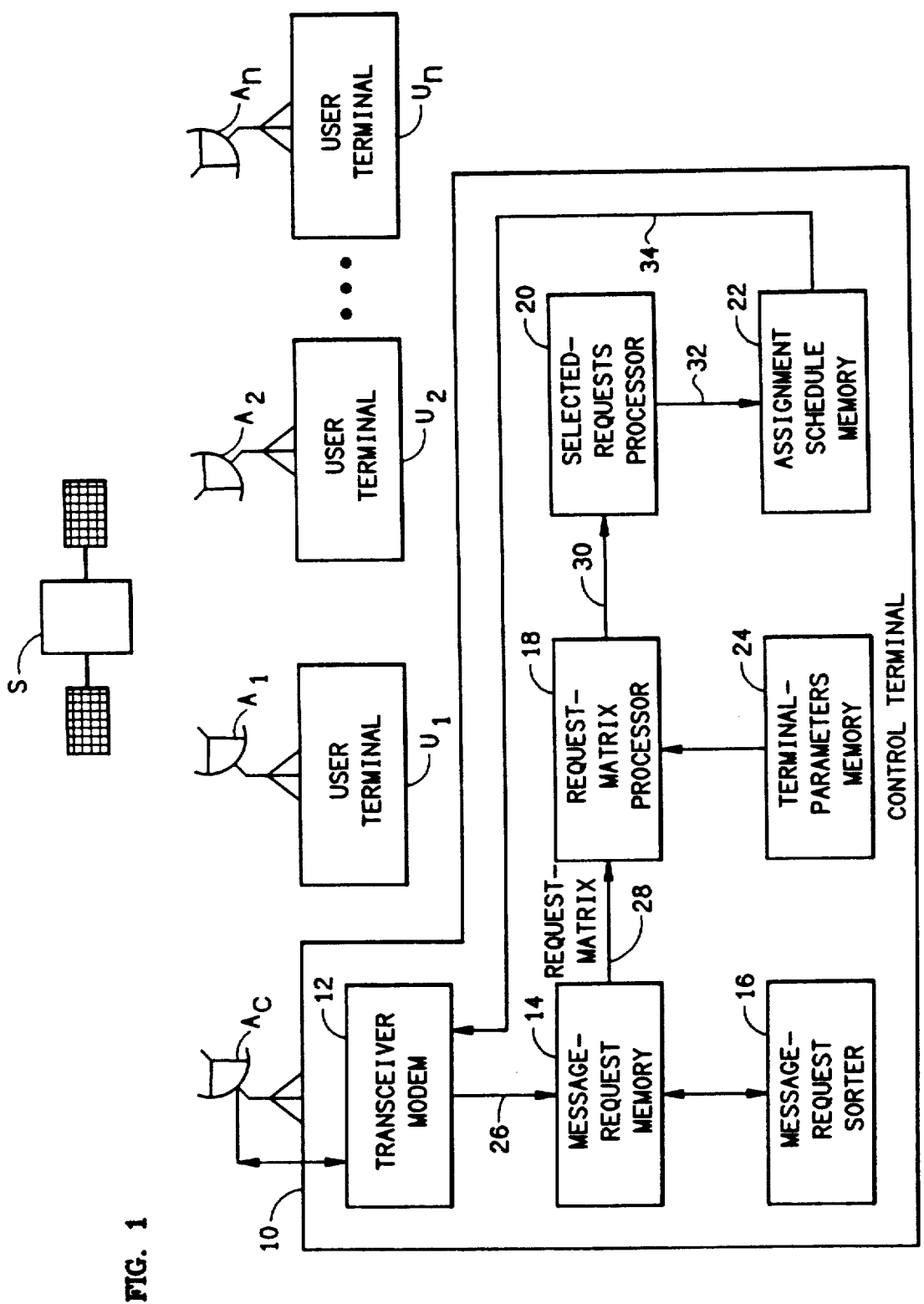
FIG. 1 is a block diagram of a multi-user communication system including an access-assignment system in accordance with the present invention.

Referring to FIG. 1, in a preferred embodiment of a multi-user communication system according to the present invention, a control terminal 10 includes a transceiver modem 12, a message-request memory 14, a message-request sorter 16, a request-matrix processor 18, a selected-request processor 20, an assignment-schedule memory 22 and a terminal-parameters memory 24, all of which (except the transceiver modem 12) are embodied in a digital computer. The multi-user communication system further includes a plurality of n user terminals $U_1, U_2, \ldots, U_n$, which communicate with each other and with the control terminal 10 via their respective antennas $A_1, A_2, \ldots, A_n$ and $A_C$ and a transponder in a communication satellite S that is in Earth orbit. In an alternative embodiment (not shown), the transponder is located on Earth rather than in orbit. Each user terminal includes only one transceiver modem, although the transceiver modem may have a plurality of ports for time-division-multiplexed operation. Given user terminals are capable of operating in different frequency channels; although a given user terminal can transmit over only one frequency channel at a time and can receive over only one frequency channel at a time.

Figure 2:
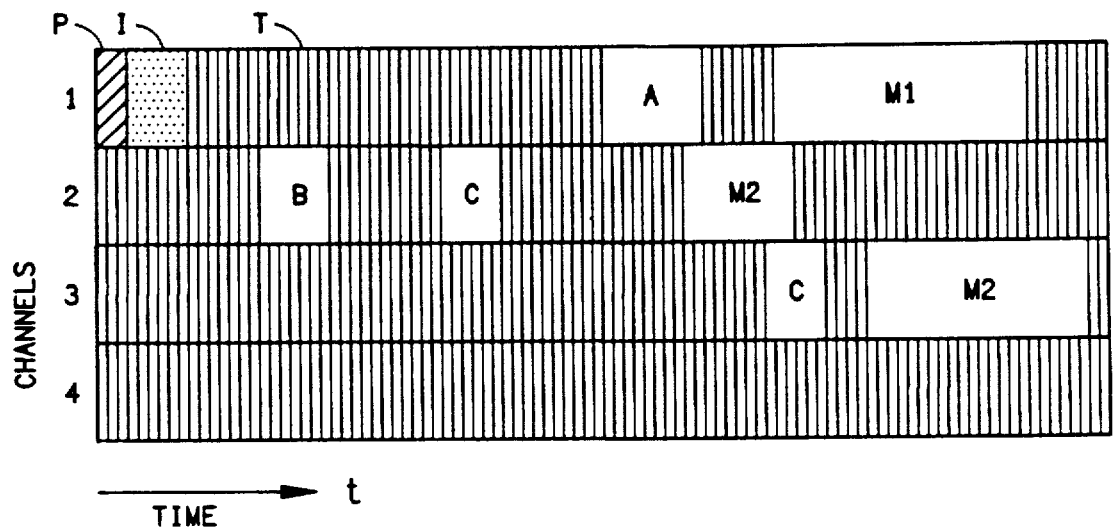
FIG. 2 is a diagram showing an array of time slots in different frequency channels, and those time slots used for transmitting certain control information to the user terminals in the system shown in FIG. 1.

Messages between the user terminals and between the user terminals and the control terminal 10 are communicated over a plurality of different frequency channels during a plurality of different time slots T, as shown in FIG. 2. FIG. 2 shows each of four different frequency channels over a single time frame. The time slots are combined by the control terminal 10 to provide assigned-access time blocks of different durations sufficient to accommodate the requested messages. The assigned-access block of time slots for a given message can be within a single frequency channel, such as message M1, or spread within a plurality of frequency channels, such as message M2.

Figure 3:
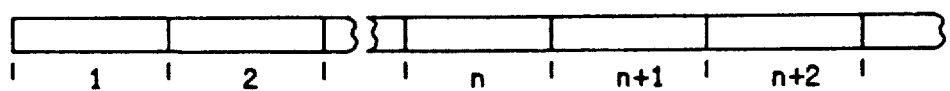
FIG. 3 is a timing diagram showing a succession of the time frames shown in FIG. 2.

Control information generated by the control terminal 10 for transmission to the user terminals is inserted during the same time slots during each time frame for a sequence of n time frames. See FIG. 3. The control information is continuously updated by the control terminal 10, and new control information is transmitted by the control terminal 10 to the user terminals during every set of n time frames beginning with frame $1, n+1, 2n+1, \ldots$.

The control information that is transmitted by the control terminal 10 to the user terminals includes a preamble P and information A, B, C to different predetermined groups of user terminals identifying the time slots for which access has been assigned for respective given user terminals in the different groups. The The assignment information A, B, C transmitted during one set of n time frames identifies the time slots for which access has been assigned for the user terminals during the set of n time frames. As may be seen in FIG. 2, the assignment information A, B, C for different predetermined groups of user terminals is transmitted non-simultaneously to the different predetermined groups of user terminals. The assignment information for a given predetermined group of user terminals is transmitted in only a single frequency channel at any one time. Thus, while the user terminals of one group receive their burst assignments on one of the frequency channels, the user terminals in the remaining groups have access to the remaining frequency channels. The assignment information A, B, C for a predetermined group of user terminals is transmitted during only a minor portion of the time frame.

To make full use of all of the frequency channels, the user terminals are partitioned into groups according to link quality. By grouping user terminals of like link signal-to-noise ratio together, their access-assignments may all be transmitted at a higher rate, whereby the number of times slots required for such transmission is minimized. User terminal group sizes are also limited so that no user is ever required to listen for the access-assignment information for more than fifteen percent of the time frame. This leaves 85% of the frame assignable for user data and voice messages.

Grouping of user terminals also can be used to reduce the number of user terminals sharing a single crypto key. If multi-level security is required for the control information, then multiple crypto keys can be used and the user terminals can be further partitioned into groups. Two user terminals would only be members of the same group if they share a crypto key for receiving the control information.

The control information that is transmitted by the control terminal 10 to the user terminals also includes information 1 indicating the respective times when the assignment information A, B, C will be transmitted for each of the different predetermined groups of user terminals and information indicating the respective times when the user terminals can transmit message-access requests to the control terminal 10. The control information 1 is simultaneously transmitted to all of the given predetermined groups of user terminals. Those time slots T in each time frame not occupied by the preamble P, the control information 1 and the assignment information A, B, C are available for access assignment for messages requested by the user terminals for communications to and from the user terminals.

Messages are transmitted and received by the control terminal 10 via the transceiver 12 and the control terminal antenna $A_C$.

The control terminal 10 assigns to given user terminals access to time slots of a time frame within which to transmit messages identified in message-access requests 26, which are received by the transceiver 12 from different given user terminals of the multi-user communication system. m The received message-access requests 26 are initially stored in the message-access request memory 14.

The user terminals $U_1, U_2, \ldots, U_n$ are associated with different organizations, with some organizations being associated with more than one of the user terminals. The message-access requests 26 identify the organization associated with the user terminal and indicate a priority set by the organization for processing the message-access requests of the identified organization.

The message-access request sorter 16 sorts the message-access requests 26 and arranges the sorted message-access requests 26 for storage in the message-access request memory 14 in accordance with the indicated priorities. Separate request queues are maintained in the memory 14 for the requests from each organization.

The request-matrix processor 18 processes a matrix 28 of the highest priority stored message-access requests in the different queues of the memory 14 from the different identified organizations in accordance with information contained in the message-access requests 26 identifying transmission parameters of the respective identified messages, in accordance with the parameters of the transmitting terminal and the receiving terminal, and in accordance with the number of available time slots to thereby select a set of the respective messages for access-assignment to the available time slots. The terminal parameters are provided to the processor 18 from the terminal-parameters memory 24. The terminal parameters are those for the user terminals and the control terminal 10, and include whether the transceiver modem of the terminal is full or half duplex, bandwidth limitations, accessible frequencies, burst preambles, clock accuracies, code rates, port baud rates, burst rates, modulation schemes, and frequency settling performance.

The processing routines performed by the request-matrix processor 18 in order to select a set of the respective messages for access-assignment to the available time slots is described later with reference to FIG. 4.

The selected-requests processor 20 means for processing the selected message-access requests 30 for the selected set of messages to assign access to different combinations of the time slots for respectively transmitting the different messages of the selected set of messages. As described above with reference to FIG. 2, the selected-requests processor 20 assigns access to different combinations of the time slots T in a plurality of different frequency channels for respectively transmitting the different messages of the selected set of messages. The selected-requests processor 20 schedules access assignments in accordance with such algorithms as described in Hopcroft and Karp, "An $n^{5/2}$ Algorithm for Maximum Matchings in Bipartite Graphs", SIAM J. Comput. 2:225-231, 1973; Inukai, "An Efficient SS/TDMA Time Slot Assignment Algorithm", IEEE Transactions on Communications, Vol. COM-27, No. 10, October 1979, 1449-1455; and Bongiovanni, Coppersmith and Wong, "An Optimum Time Slot Assignment Algorithm for an SS/TDMA system with variable Number of Transponders", IEEE Transactions on Communications, Vol. COM-29, No. 5, May 1981, 721-726, the disclosures of which are incorporated herein by reference.

The selected-requests processor 20 iteratively processes the selected message-access requests 30 to provide a succession of access-assignment schedules 32 culminating in a final access-assignment schedule 34, which is provided to the transceiver modem 12 for transmission. Each of the succession of access-assignment schedules 32 is stored in the assignment-schedule memory 22 as provided by the selected-requests processor 20. The assignment-schedule memory 22 retains at least the latest of the succession of access-assignment schedules 32; and the latest access-assignment schedule 34 stored in the assignment-schedule memory 22 prior to the beginning of the time frame in which transmission of a complete set of assignment information to all of the predetermined groups of the user terminals commences, is the assignment information that is transmitted to the user terminals. This assures that at least the best assignment schedule that the selected-requests processor 20 has been able to provide prior to the time for transmission will be transmitted, even if the selected-requests processor 20 does not fully complete processing the selected message-access requests 30 prior to the time for such transmission.

For each block of time slots that is assigned to a requested message by the selected-requests processor 20, the scheduled access-assignment 34 that is transmitted to a user terminal identifies a carrier frequency, a starting time slot, and ending time slot, a burst code, and a message length. The burst code defines the preamble type, modulation scheme, burst rate and forward error correction scheme. The message length is the number of bits of end user data that is to be transmitted in the message burst.

Figure 4:
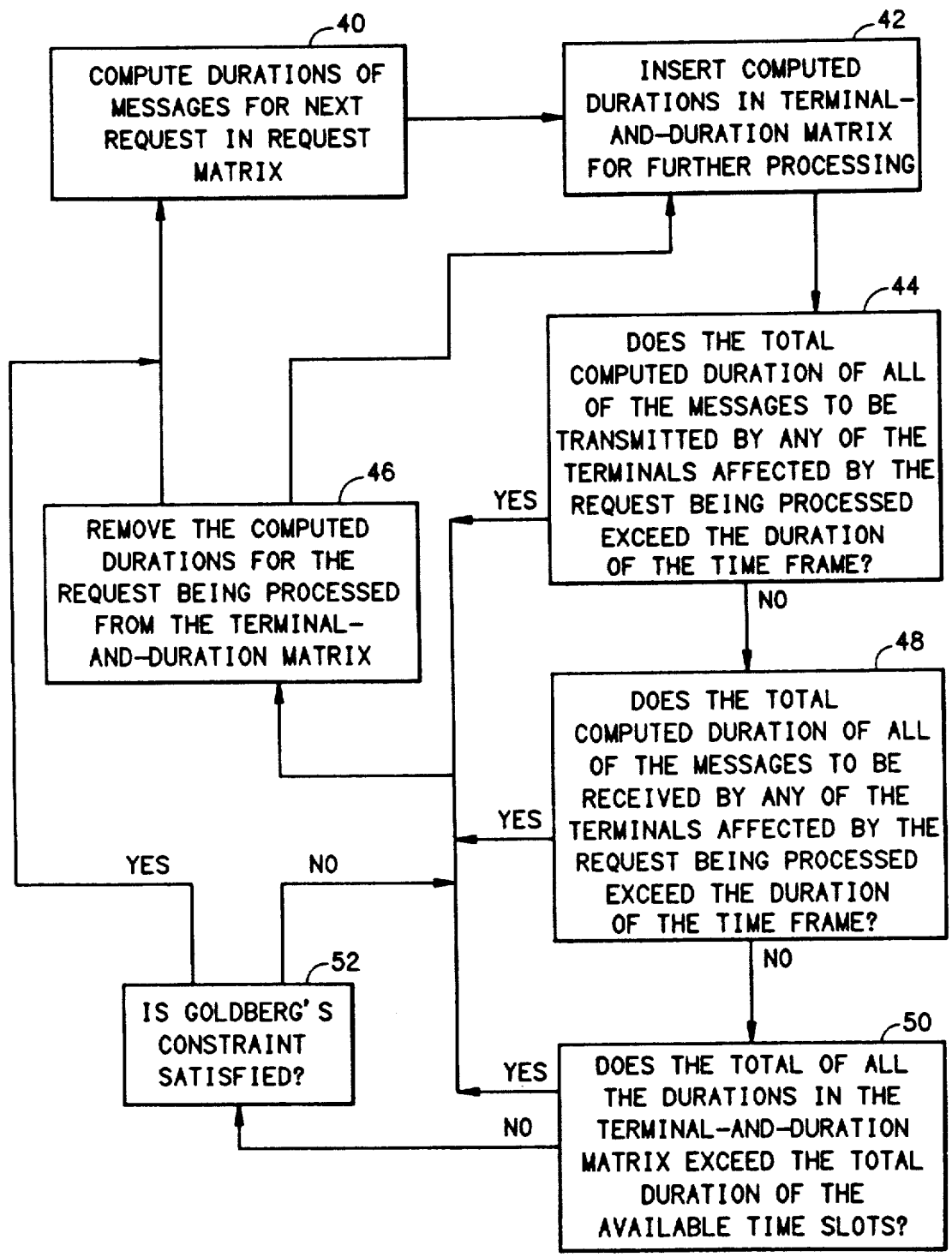
FIG. 4 is a diagram illustrating certain processing functions performed by the stored request processor in the system shown in FIG. 1.

Referring to FIGS. 1 and 4, the request-matrix processor 18 performs a number of processing routines in order to select a set of the respective messages for access-assignment to the available time slots.

First, the processor 18 performs a routine 40 of computing the durations of the messages for the next request in the request matrix 28 stored in the message-request memory 14. A given request may be for more than one message. For example, a given message request may call for an access assignment for a message transmitted from user terminal $U_1$ to user terminal $U_2$ and for an access assignment for a message transmitted from user terminal $U_2$ to user terminal $U_1$.

The request-matrix processor 18 computes the duration(s) of the message(s) for which access-assignment is requested by processing information contained in the message-access request identifying transmission parameters of the identified message(s), and information retrieved from the terminal-parameters memory 24 identifying the parameters of the transmitting terminal and the receiving terminal affected by the request being processed.

Only a segment of a typical message is transmitted during each time frame, with each segment of the message being compressed into a message burst. Each message burst typically includes a preamble, start-of-message (SOM) bits used to mark the beginning of data, data, and a guard band.

The following formula is used to determine the number of time slots required for assignment to a given message:

NUMBER OF TIME SLOTS =

$$\left\lceil \frac{\frac{DATA + PREAMBLE + SOM}{BURST\ RATE} + GUARD\ TIME}{\frac{TIME\ FRAME\ DURATION}{TIME\ SLOT\ DURATION}} \right\rceil$$

Blocks of time slots for accommodating a broad range of burst preambles, clock accuracies, code rates, port baud rates, burst rates, and modulation schemes can be defined through this approach.

The request-matrix processor 18 next performs a routine 42 of inserting the computed durations in a terminal-and-duration matrix for further processing. An example of a terminal-and-duration matrix is shown below.

|  |  | RECEIVING TERMINAL | | | | |
|---|---|---|---|---|---|---|
|  |  | C | $U_1$ | $U_2$ | — | $U_n$ |
| TRANSMITTING | C | xx | 20 | 20 | — | 30 |
| TERMINAL | $U_1$ | 5 | xx | 0 | — | 0 |
|  | $U_2$ | 10 | 20 | xx | — | 10 |
|  | — | — | — | — | — | — |
|  | $U_n$ | 10 | 0 | 0 | — | xx |

The terminal-and-duration matrix indicates the computed durations of messages to be transmitted and received by each terminal in the network, including the control terminal C as well as the user terminals. For example the left most entry in the second horizontal row of the matrix indicates that a block of ten time slots has been allocated for user terminal $U_1$ to send a message to the control terminal C.

The request-matrix processor 18 next performs a first terminal-constraint routine 44 in which it determines whether the total computed duration of all the messages to be transmitted by any of the terminals affected by the request being processed exceeds the duration of the time frame.

If the total computed duration of all the messages to be transmitted by any of the terminals affected by the request being processed exceeds the duration of the time frame, the request-matrix processor 18 next performs a routine 46 in which the computed durations for the request being processed are removed from the terminal-and-duration matrix. The request-matrix processor 18 then again performs the routine 40 of computing the durations of the messages for the next request in the request matrix 28 stored in the message-request memory 14.

If the total computed duration of all the messages to be transmitted by any of the terminals affected by the request being processed does not exceed the duration of the time frame, the request-matrix processor 18 next performs a second terminal-constraint routine 48, in which it determines whether the total computed duration of all the messages to be received by any of the terminals affected by the request being processed exceeds the duration of the time frame.

If the total computed duration of all the messages to be received by any of the terminals affected by the request being processed exceeds the duration of the time frame, the request-matrix processor 18 next performs the routine 46 in which the computed durations for the request being processed are removed from the terminal-and-duration matrix. The request-matrix processor 18 then again performs the routine 40 of computing the durations of the messages for the next request in the request matrix 28 stored in the message-request memory 14.

If the total computed duration of all the messages to be received by any of the terminals affected by the request being processed does not exceed the duration of the time frame, the request-matrix processor 18 next performs a duration-constraint routine 50 in which it determines whether the total of all the durations in the terminal-and-duration matrix exceeds the total duration of the available time slots.

If the total of all the durations in the terminal-and-duration matrix exceeds the total duration of the available time slots, the request-matrix processor 18 next performs a routine 46 in which the computed durations for the request being processed are removed from the terminal-and-duration matrix. The request-matrix processor 18 then again performs the routine 40 of computing the durations of the messages for the next request in the request matrix 28 stored in the message-request memory 14.

If the total of all the durations in the terminal-and-duration maxtrix does not exceed the total duration of the available time slots, the request-matrix processor 18 next performs a routine 52 in which it determines whether Goldberg's constraint is satisfied.

Goldberg's constraint provides that for any group of K terminals in a communication network, if $\tau$ is the total number of time slots required for the messages transmitted and received by the terminals of such group to or from another member of such group, then the total number of time slots required to schedule the messages between the terminals of such group must be at least as great as $[\tau/\!\lfloor K/2 \rfloor]$. If the quantity K/2 is not an integral number, the fractional portion is truncated.

It is necessary to determine whether or not Goldberg's constraint is satisfied whenever any terminal in a group of K terminals does not have the capability of simultaneously transmitting and receiving.

For example, for a group of three terminals, X, Y and Z, in which terminal X is a half-duplex terminal and terminals Y and Z are full duplex terminals, such that the number of time slots required for messages transmitted to or received from terminal X by terminals Y and Z is 20 and the number of time slots required for messages transmitted and received between terminals Y and Z is 10, the total number of time slots required to schedule messages between the terminals Y and Z is 10, the total number of time slots required to schedule messages between the terminals X, Y and Z is $[50/3/2] = 50$. Note that the quantity (K/2 = 3/2 is truncated to equal 1).

Goldberg's constraint is further discussed in a paper by Mark K. Goldberg, entitled "Edge-Coloring of Multigraphs: Recoloring Technique", published in the Journal of Graph Theory, Vol. 8 (1984) 123-137, the disclosure of which is incorporated herein by reference.

Chromatic graph theory provides an excellent model for assigning time slots in a multi-user DAMA communication system. The user terminals are represented by vertices. Messages requests between user terminals are represented by edges connecting the vertices. Multiple edges are used, one per time slot requested. Thus, the underlying model is a multigraph—a graph with multiple edges (but no edge connecting a vertex to itself in this application). Scheduling access assignments corresponds to edge colorings of the multigraph. Each color represents a time slot. Edges sharing a vertex must be colored differently so that a user terminal will not be required to simultaneously participate in two different requests. A schedule will exist if the number of colors used does not exceed the number of time slots in the frame and if the number of edges colored the same color never exceeds the number of frequency channels allowed.

If Goldberg's constraint is not satisfied, the request-matrix processor 18 next performs a routine 46 in which the computed durations for the request being processed are removed from the terminal-and-duration matrix. The request-matrix processor 18 then again performs the routine 40 of computing the durations of the messages for the next request in the request matrix 28 stored in the message-request memory 14.

If Goldberg's constraint is satisfied, the request being process is retained in the terminal-and-duration matrix and the request-matrix processor 18 then again performs the routine 40 of computing the durations of the messages for the next request in the request matrix 28 stored in the message-request memory 14.

In addition to the message requests from the user terminals, the request matrix 28 includes message requests generated by the control terminal 10 itself for assigning time slots for transmitting the control information from the control terminal to the different groups of user terminals. These message request for transmitting the control information are accorded a high processing priority by the request-matrix processor 18.

Only a limited number of time slots and throughput are allocated for each of the organizations, and once such limit for a given organization is reached, processing of further message request by that given organization is suspended by the request-matrix processor 18 until the message requests by the other organizations within their allocation limits and the message requests for transmitting the information have been processed.

At the lowest priority, the request matrix 28 further includes message requests generated by the control terminal 10 for assigning time slots in which the user terminals can transmit message requests to the control terminal 10. A common block of time slots for transmitting message requests is assigned to a predetermined group of user terminals, with different common blocks of time slots for transmitting message requests being assigned to different predetermined groups of user terminals. This assignment scheme is an improvement over an Aloha scheme since the control terminal can make such assignments based on previous history or a priori knowledge of user access requirements. The Aloha scheme is described in Abramson, "The Aloha System—Another Alternative for Computer Communication", Proceedings of the AFIPS Fall Joint Computer Conference, Vol. 37, 1970, 281-285. Even if the control terminal has no a priori knowledge, this scheme is better than the Aloha scheme since having the user terminal select a random number is equivalent to the control terminal select a random number and giving it to the user terminal. The advantage of the selection being made by the control terminal is that the control terminal knows which of the time slots will not be accessed in response to a message request, whereby such times slots are available for sending message requests. In addition the control terminal can reduce the chances for collisions of simultaneously transmitted message requests by uniformly distributing the number of user terminals assigned to a block of time slots for transmitting message requests.

After the request-matrix processor 18 has completed processing the message requests in the request matrix 28 and thereby selected a set of message requests for scheduling of access assignments, the selected set of message requests 30 is processed by the selected-requests processor 20, as described above.

The operational concepts associated with the multicarrier DAMA communication system described herein are discussed in a paper by G. M. Engel and E. F. Smith, entitled "Multiple Channel Demand Assignment Multiple Access (DAMA) System Design For UHF MILSATION", published by the American Institute of Aeronautics and Astronasutics, Inc. In 1990 (need cite), the entire disclosure of which is incorporated herein by reference thereto.

The system of the present invention provides efficient scheduling of non-homogeneous networks of user terminal modems. Full and half duplex constraints are supported simultaneously, with mixtures of half-duplex and full duplex modems.

The system of the present invention also schedules messages between modems that don't have identical capabilities but have at least one common modulation scheme, code rate and burst preamble; shares resources across networks of incompatible modems; and schedules messages on multiple channels, which may have varying bandwidth limitations (i.e. supports pooling of 5 and 25 Khz carriers). This last feature can be used to optimize the number of channels in networks having user terminals with less robust capability.

The system of the present invention also distributes pooled resources in accordance with predetermined allocations for the different organizations first and then allocates the remaining time slots as needed.

We claim:

1. A system for assigning to given user terminals in a multiple-user communication system access to time slots of a time frame within which to transmit messages identified in message-access requests from different given user terminals, comprising means for storing a plurality of message-access requests from different given user terminals;

means for first processing the stored message-access requests to schedule the identified messages for transmission in accordance with predetermined priority constraints, in accordance with information contained in the message-access requests identifying transmission parameters of the respective identified messages and in accordance with the number of available time slots to thereby select a set of the respective messages for access-assignment to the available time slots; and means for subsequently processing the message-access requests for the selected set of messages to assign access to different combinations of the time slots for respectively transmitting the different messages of the selected set of messages;

wherein the user terminals are associated with different organizations, with some organizations being associated with more than one of the user terminals and wherein the message-access requests identify the organization associated with the user terminal and indicate a priority set by the organization for processing the message-access requests of the identified organization;

wherein the processing means sort the message-access requests and arranges the sorted requests for storage in the storing means in accordance with said indicated priorities; and wherein the processing means process a matrix of the highest priority stored message-access requests from the different identified organizations when selecting the set of the respective messages that are selected for access-assignment to the available time slots.

2. A system for assigning to given user terminals in a multiple-user communication system access to time slots of a time frame within which to transmit message identified in message-access requests from different given user terminals, wherein some of the user terminals do not have the capability of simultaneously transmitting and receiving, the system for assigning comprising means for storing a plurality of message-access requests from different given user terminals;

means for first processing the stored message-access requests to schedule the identified messages for transmission in accordance with predetermined priority constraints, in accordance with information contained in the message-access requests identifying transmission parameters of the respective identified messages and in accordance with the number of available time slots to thereby select a set of the respective messages for access-assignment to the available time slots; and means for subsequently processing the message-access requests for the selected set of messages to assign access to different combinations of the time slots for respectively transmitting the different messages of the selected set of messages;

wherein the processing means processing the message-access requests to select the set of the respective messages that are selected for access-assignment to the available time slots in accordance with the combined computed durations of those selected messages that are transmitted between a plurality of the given user terminals not exceeding Goldberg's constraint.

3. A system for assigning to given user terminals in a multiple-user communication system access to time slots of a time frame within which to transmit messages identified in message-access requests from different given user terminals, comprising means for storing a plurality of message-access requests from different given user terminals;

means for processing the stored message-access requests to schedule the identified messages for transmission in accordance with information contained in the message-access requests identifying transmission parameters of the respective identified messages and in accordance with the number of available time slots by assigning access to different combinations of the time slots for respectively transmitting different messages identified by the processed message-access requests; and means for transmitting assignment information to the given user terminals identifying the time slots for which access has been assigned for the respective given user terminals, with the assignment information for a predetermined group of given user terminals being transmitted during a common block of time slots, and with the assignment information for different predetermined groups of user terminals being transmitted non-simultaneously to the different predetermined groups of user terminals;

wherein the transmitting means simultaneously transmits to all of the given predetermined groups of user terminals information indicating the respective times when the assignment information will be transmitted for each of the different predetermined groups of user terminals.

4. A multi-user communication system including a plurality of user terminals and a control terminal that communicate with each, wherein the control terminal includes means for assigning to given user terminals access to time slots of a time frame within which to transmit messages identified in message-access requests from different given user terminals, wherein some of the user terminals do not have the capability of simultaneously transmitting and receiving, said means for assigning comprising means for storing a plurality of message-access requests from different given user terminals;

means for processing the stored message-access requests to schedule the identified messages for transmission in accordance with predetermined priority constraints, in accordance with information contained in the message-access requests identifying transmission parameters of the respective identified messages and in accordance with the number of available time slots to thereby select a set of the respective messages for access-assignment to the available time slots; and means for processing the message-access requests for the selected set of messages to assign access to different combinations of the time slots for respectively transmitting the different messages of the selected set of messages;

wherein the processing means process the message-access requests to select the set of the respective messages that are selected for access-assignment to the available time slots in accordance with the combined computed durations of those selected messages that are transmitted between a plurality of the given user terminals not exceeding Goldberg's constraint.

5. A multi-user communication system including a plurality of user terminals and a control terminal that communicate with each, wherein the control terminal includes means for assigning to given user terminals access to time slots of a time frame within which to transmit messages identified in message-access requests from different given user terminals, said means for assigning comprising means for storing a plurality of message-access requests from different given user terminals;

means for processing the stored message-access requests to schedule the identified messages for transmission in accordance with predetermined priority constrains, in accordance with information contained in the message-access requests identifying transmission parameters of the respective identified messages and in accordance with the number of available time slots to thereby select a set of the respective messages for access-assignment to the available time slots; and means for processing the message-access requests for the selected set of messages to assign access to different combinations of the time slots for respectively transmitting the different messages of the selected set of messages;

wherein the user terminals are associated with different organizations, with some organizations being associated with more than one of the user terminals and wherein the message-access requests identify the organization associated with the user terminal and indicate a priority set by the organization for processing the message-access requests of the identified organization.

wherein the processing means sort the message-access requests and arranges the sorted requests for storage in the storing means in accordance with said indicated priorities; and wherein the processing means process a matrix of the highest priority stored message-access requests of the identified organizations when selecting the set of the respective messages that are selected for access-assignment to the available time slots.

6. A multi-user communication system including a plurality of user terminals and a control terminal that communicate with each, wherein the control terminal includes means for assigning to given user terminals access to time slots of a time frame within which to transmit messages identified in message-access requests from different given user terminals, said assigning means comprising means for storing a plurality of message-access requests from different given user terminals;

means for processing the stored message-access requests to schedule the identified messages for transmission in accordance with information contained in the message-access requests identifying transmission parameters of the respective identified messages and in accordance with the number of available time slots by assigning access to different combinations of the time slots for respectively transmitting different messages identified by the processed message-access requests; and means for transmitting assignment information to the given user terminals identifying the time slots for which access has been assigned for the respective given user terminals, with the assignment information for a predetermined group of given user terminals being transmitted during a common block of time slots, and with the assignment information for different predetermined groups of user terminals being transmitted non-simultaneously to the different predetermined groups of user terminals;

wherein the transmitting means simultaneously transmits to all of the given predetermined groups of user terminals information indicating the respective times when the assignment information will be transmitted for each of the different predetermined groups of user terminals.

7. A system for assigning to given user terminals in a multiple-user communication system access to time slots of a time frame within which to transmit messages identified in message-access requests from different given user terminals, wherein different predetermined groups of the user terminals have respectively different common link qualities, comprising means for storing a plurality of message-access requests from different given user terminals;

means for processing the stored message-access requests to schedule the identified messages for transmission in accordance with information contained in the message-access requests identifying transmission parameters of the respective identified messages and in accordance with the number of available time slots by assigning access to different combinations of the time slots for respectively transmitting different messages identified by the processed message-access requests; and means for transmitting assignment information to the given user terminals identifying the time slots for which access has been assigned for the respective given user terminals, with the assignment information for a predetermined group of given user terminals having a common link quality being transmitted during a common block of time slots, and with the assignment information for different predetermined groups of user terminals having respectively different common link qualities being transmitted non-simultaneously to the different predetermined groups of user terminals.

8. A system for assigning to given user terminals in a multiple-user communication system access to time slots of a time frame within which to transmit messages identified in message-access requests from different given user terminals, wherein different predetermined groups of the user terminals share respectively different common crypto keys, comprising means for storing a plurality of message-access requests from different given user terminals;

means for processing the stored message-access requests to schedule the identified messages for transmission in accordance with information contained in the message-access requests identifying transmission parameters of the respective identified messages and in accordance with the number of available time slots by assigning access to different combinations of the time slots for respectively transmitting different messages identified by the processed message-access requests; and means for transmitting assignment information to the given user terminals identifying the time slots for which access has been assigned for the respective given user terminals, with the assignment information for a predetermined group of given user terminals sharing a common crypto key being transmitted during a common block of time slots, and with the assignment information for different predetermined groups of user terminals sharing respectively different common crypto keys being transmitted non-simultaneously to the different predetermined groups of user terminals.

9. A multi-user communication system including a plurality of user terminals and a control terminal that communicate with each other, wherein the control terminal includes means for assigning to given user terminals access to time slots of a time frame within which to transmit messages identified in message-access requests from different given user terminals, and wherein different predetermined groups of the user terminals have respectively different common link qualities, said assigning means comprising means for storing a plurality of message-access requests from different given user terminals;

means for processing the stored message-access requests to schedule the identified messages for transmission in accordance with information contained in the message-access requests identifying transmission parameters of the respective identified messages and in accordance with the number of available time slots by assigning access to different combinations of the time slots for respectively transmitting different messages identified by the processed message-access requests; and means for transmitting assignment information to the given user terminals identifying the time slots for which access has been assigned for the respective given user terminals, with the assignment information for a predetermined group of given user terminals having a common link quality being transmitted during a common block of time slots, and with the assignment information for different predetermined groups of user terminals having respectively different common link qualities being transmitted non-simultaneously to the different predetermined groups of user terminals.

10. A multi-user communication system including a plurality of user terminals and a control terminal that communicate with each other, wherein the control terminal includes means for assigning to given user terminals access to time slots of a time frame within which to transmit messages identified in message-access requests from different given user terminals, and wherein different predetermined groups of the user terminals share respectively different common crypto keys, said assigning means comprising means for storing a plurality of message-access requests from different given user terminals;

means for processing the stored message-access requests to schedule the identified messages for transmission in accordance with information contained in the message-access requests identifying transmission parameters of the respective identified messages and in accordance with the number of available time slots by assigning access to different combinations of the time slots for respectively transmitting different messages identified by the processed message-access requests; and means for transmitting assignment information to the given user terminals identifying the time slots for which access has been assigned for the respective given user terminals, with the assignment information for a predetermined group of given user terminals sharing a common crypto key being transmitted during a common block of time slots, and with the assignment information for different predetermined groups of user terminals sharing respectively different common crypto keys being transmitted non-simultaneously to the different predetermined groups of user terminals.

* * * * *

UNITED STATES PATENT AND TRADEMARK OFFICE
CERTIFICATE OF CORRECTION

PATENT NO. : 5,197,125
DATED : March 23, 1993
INVENTOR(S) : Gernot M. Engel, et al.

It is certified that error appears in the above-identified patent and that said Letters Patent is hereby corrected as shown below:

Column 1, line 24, chane "linke" to

Column 4, line 18, delete "The" (last occurrence).

Column 5, line 11, delete "m"

Column 8, line 55, change "[L50/3/2]]" to --[50/L3/2]]--.

Column 10, line 16, change "MILSATION" to --MILSATCOM--.

Column 11, line 37, change "processing" (second occurrence) to --process--.

Column 13, line 16, change "of" to --from--.

Column 13, line 17, after "the" (First occurrence), insert --different--.

Signed and Sealed this

Thirtieth Day of November, 1993

BRUCE LEHMAN

Attest:

Attesting Officer

Commissioner of Patents and Trademarks